Jan. 28, 1936. N. A. PALMGREN 2,029,275
RADIAL PLAIN BEARING FOR GREASE LUBRICATION
Filed Jan. 19, 1935
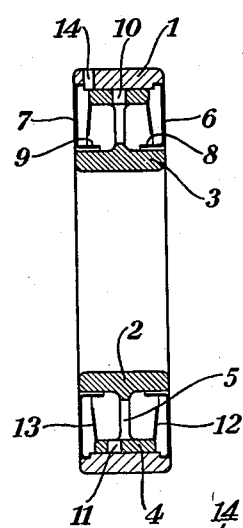
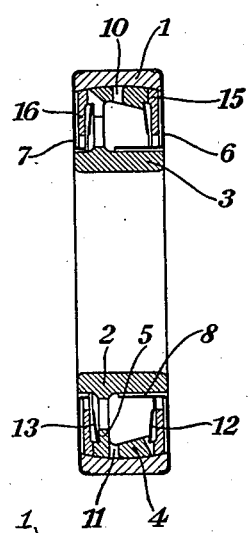
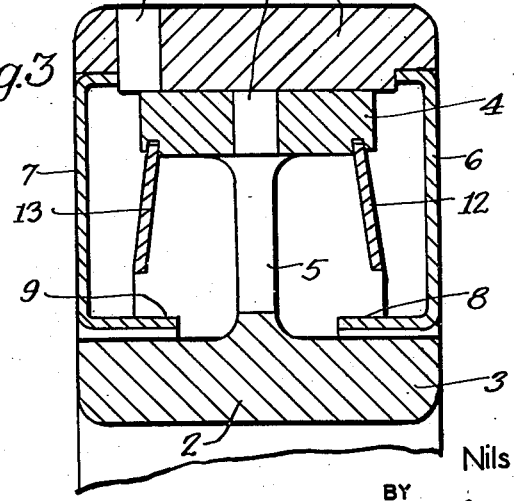
INVENTOR
Nils Arvid Palmgren
BY
his ATTORNEY Patented Jan. 28, 1936

2,029,275

UNITED STATES PATENT OFFICE 2,029,275

RADIAL PLAIN BEARING FOR GREASE LUBRICATION

Nils Arvid Palmgren, Goteborg, Sweden, assignor to Aktiebolaget Svenska Kullagerfabriken, Goteborg, Sweden, a corporation of Sweden Application January 19, 1935, Serial No. 2,598
In Sweden November 2, 1934

4 Claims. (Cl. 308—127)

In plain bearings having circulatory lubrication with a cohesive lubricant, for example grease, it is of importance that a part of the supply of lubricant be caused to take part in the rotation of the bearing. In bearings comprising a rotatable bearing member with an annular flange supported by a web of substantially smaller axial extension than the flange and which bearing member has an external sliding surface bearing against a non-rotating bearing member, and is provided with lubricating channels connecting the inner periphery of the flange with the sliding surface, it may sometimes happen that, when using a stiff grease, the grease sticks to non-rotating bearing members, thereby leaving the rotating bearing member and the sliding surface unlubricated.

By the present invention effective means are provided to guarantee that circulation of the lubricant is maintained under all conditions. The invention is substantially characterized by separating discs or the like, fixed to the rotatable flange. These discs have an extension inwards towards the bearing center, and form together with the flange an annular rotatable lubrication chamber. The grease contained in this chamber is forced to take part in the rotation of the bearing and is thus pressed outwards by the centrifugal force to the sliding surface through the channels in the flange. The separating discs thus serve the purpose of separating the grease sticking to the inner side of the flange and around the web from the surrounding grease retained by the non-rotating bearing members.

The invention is illustrated in the accompanying drawing of which,

Figure 1 is a section in an axial plane through a bearing according to one embodiment of the invention, Figure 2 is a similar section through a bearing according to another embodiment, and Figure 3 is an enlarged detail of the upper portion of Figure 1, more clearly depicting the side discs and separating discs.

In Figure 1 the outer ring 1 is provided with a cylindrical sliding surface at the inner periphery. The inner ring 2 comprises an inner flange 3, for mounting on a shaft, an outer flange 4 having a cylindrical sliding surface on its outer periphery and a web 5, connecting the two flanges. As shown in Figure 1, the inner ring is in this case symmetrical and of I-section. Two side plates 6, 7 are fixed to the outer ring 1 in such a manner that the joint is leak proof. These side plates extend inwardly towards the bearing center and have axially extending flanges 8, 9 adjacent to the inner flange 3 of the inner ring 2 forming a seal against the flange of the inner ring. The outer flange 4 of the inner ring 2 is perforated by channels 10, 11, connecting the sliding surface with the chamber formed by the side plates and the bearing rings. Two separating discs 12, 13 are provided at the edges of the outer flange 4 of the inner ring 2 which discs extend towards the center of the bearing but leave an annular opening between their inner edges and the inner flanges 8, 9 of the side plates. Finally there is an opening 14 in the outer ring through which lubricant can be pressed into the bearing between the side plates and the separating discs.

If the whole of the interior is filled with grease and the inner ring and separating discs rotate, while the outer ring and side plates remain stationary, the larger part of the grease contained between the side plates and the adjacent separating discs will stick to the side plates and remain stationary. On the other hand the non-rotating parts are unable to hold the part of the grease enclosed between the side plates and the web and flange of the inner ring. This grease rotates with the inner ring and is pressed by the centrifugal force out through the holes 10, 11 to the sliding surface, where a load carrying lubricant film is formed. The grease is pressed by the bearing load to the sides and enters the chambers between the side plates and the separating discs. The channel 14 is kept closed by the bearing housing. The grease which is pressed from between the bearing rings into the spaces between the side plates and the separating discs forces the grease remaining in these spaces through the openings between the inner edges of the separating discs and the inner flanges 8, 9 of the side plates, thereby returning it to the chamber between the separating discs and the inner ring. The grease will then continue to be automatically circulated within the bearing by the centrifugal force and the pressure of the load. The pressure by means of which the grease is pressed out through the holes 10, 11, is considerably increased thereby that a comparatively great quantity of grease is collected between the separating discs and subjected to centrifugal force. The circulation is maintained as long as any grease remains in the chamber between the separating discs, i. e. until a quantity corresponding to the quantity originally contained in the chamber between the separating discs has leaked through the seal between the flanges 8, 9, and the inner flange 3 of the inner ring. Experience has shown that, owing to its consistency, the grease does not penetrate through this seal whether the bearing is running or not, provided the melting point of the grease exceeds the maximum temperature occurring in the bearing.

In Figure 2 the outer ring 1 is provided with an internal spherical sliding surface. The web 5 of the inner ring 2 is unsymmetrically positioned so that the inner flange 8 of the side plate 6 covers the greater part of the inner periphery of the annular chamber formed by the outer flange 4 of the inner ring 2 and the separating discs 12 and 13. By this means further guarantee is provided that the grease will remain in the interior of the bearing, even though the bearing be mounted on a vertical shaft with the side plate 6 downwards.

In order to take thrust, the bearing is provided with supporting discs 15, 16, which bear against the spherical sliding surface of the outer ring 1 and against the plane edges of the flange 4 of the inner ring. These supporting discs fill the greater part of the spaces between the side plates and the separating discs and lie quite close to the latter. By this means the return of grease, pressed from the sliding surface to the chamber between the separating discs is facilitated.

Finally it should be mentioned that the side plates may be replaced by parts of the bearing housing, provided there is an effective seal between bearing housing and shaft.

Having thus described my invention, I claim and desire to secure by Letters Patent:

1. A radial plain bearing for grease lubrication, characterized by the combination of an outer bearing ring with an inner sliding surface, an inner bearing ring, consisting of an inner flange for mounting on a shaft and an outer flange with an external sliding surface to bear against the outer bearing ring and a web, connecting the inner and outer flanges of the inner bearing ring, lubricating channels from the inner to the outer side of the outer flange of the inner bearing ring, side plates fixed to the outer bearing ring and extending inwardly towards the bearing center and constituting a seal against the inner flange of the inner bearing ring and enclosing a chamber formed by the side plates and the bearing rings, and separating discs fixed at the edges of the outer flange of the inner bearing ring and extending inwardly towards the bearing center at a radius which is greater than the smallest radius of the side plates, the said separating discs together with the outer flange of the inner bearing ring forming a chamber within the chamber formed by the side plates and the bearing rings.

2. A radial plain bearing according to claim 1 having a spherical sliding surface, and supporting discs bearing against the spherical sliding surface of the outer bearing ring and against the side faces of the outer flange of the inner bearing ring and extending inwardly towards the bearing center, characterized thereby that the separating discs are located near the supporting discs, so that the greater part of the space between the side plates and the bearing rings is contained by the chamber enclosed by the separating discs and the inner bearing ring.

3. Radial plain bearing according to claim 1, characterized thereby that the web connecting the inner and outer flanges of the inner bearing ring is unsymmetrically located and that the part of one of the side plates nearest to the inner bearing ring is extended to form a flange bounding the greater part of the space contained between the inner bearing ring and the separating discs.

4. Radial plain bearing according to claim 1, characterized by a lubricating channel connecting the outside of the outer bearing ring with that part of the chamber which is contained between the side plates and the separating discs.

NILS ARVID PALMGREN.